United States Patent [19]

Weisgerber

[11] 4,043,124
[45] Aug. 23, 1977

[54] POWER STEERING GEAR

[75] Inventor: Thomas W. Weisgerber, Saginaw, Mich.

[73] Assignee: General Motors Corporation, Detroit, Mich.

[21] Appl. No.: 671,026

[22] Filed: Mar. 29, 1976

[51] Int. Cl.² .......................................... B62D 5/08
[52] U.S. Cl. ..................................... 60/404; 180/133
[58] Field of Search ................. 180/133; 60/404, 403, 60/405; 91/375 A

[56] References Cited
U.S. PATENT DOCUMENTS 3,458,998  8/1969  Bishop ............................. 60/404 X
3,579,984  5/1971  Rhode .............................. 60/404 X

*Primary Examiner*—Joseph F. Peters, Jr.
*Assistant Examiner*—John A. Pekar
*Attorney, Agent, or Firm*—Charles R. White

[57] ABSTRACT

Power steering gear for vehicles having primary and secondary modes of power operation. In the event of loss of primary system operating pressure, pressure from an accumulator is directed by a closed center valve device within the gear to provide for the powered steering of the vehicle. When the accumulator is exhausted the steering gear enters a manual mode of operation for continued vehicle dirigibility.

5 Claims, 4 Drawing Figures

POWER STEERING GEAR

This invention relates to power steering gear for vehicles and more particularly to a new and improved gear having primary and secondary power steering systems with the secondary system incorporating an accumulator and closed center valve means actuated by primary valve means in the event of a reduction in pressure in the primary system to a predetermined level to provide for the auxiliary powered steering of the vehicle.

In the preferred embodiment of this invention a secondary power steering system is incorporated in a power steering gear so that powered steering is available when there is little or no pressure in a primary power steering system. The primary system has a handwheel-actuated open center rotary valve, hydraulically connected to an engine driven power steering pump, that controls the powered movement of a piston nut in the gear. The piston nut is drivingly connected through a sector gear, pitman shaft and linkage means to the dirigible wheels of a vehicle so that any piston nut movement and resulting turning movement of the sector gear will cause the turning of the dirigible wheels. The secondary system comprises an accumulator hydraulically connected to a closed center valve within the power steering unit. The closed center valve is mechanically actuated by means of the open center valve when it is moved to a closed position by the hand wheel and when there is little or no pressure available in the primary system. The secondary or closed center valve incorporates a torsion tube which spring loads the secondary valve components and centers these components when there is no mechanical input from the hand wheel. When the hand wheel actuates the secondary valve, the torsion tube is twisted and first or second ball check valves of the closed center valve are opened depending on direction of rotation to feed pressure from the accumulator to one side of the piston nut or the other for the appropriate powered steering of the vehicle. When the steering effort ceases the torsion tube will center the secondary valve elements to terminate secondary power steering. In addition to spring loading the secondary valve components, the torsion tube has the additional function of providing a path for supplying oil to the closed center secondary valve as well as a path into one of the chambers of the piston nut.

In addition to the above, a further feature, object and advantage of this invention is to provide a new and improved closed center valve construction in a vehicle power steering gear that maintains dirigibility of the vehicle when there is an absence or substantial reduction of pressure in a primary power steering system.

It is further an object, feature and advantage of this invention to provide a secondary power steering system in a power steering gear that augments a primary power steering system and that maintains its own integrity due to the sealing effects of new and improved ball check valves in a secondary valve construction within the unit.

It is further a feature, object and advantage of this invention to provide a new and improved spring loaded thrust bearing assembly in a power steering gear which will cause components of a secondary valve providing auxiliary power steering to exhibit low hysteresis while being self-protecting during high manual load steering modes.

These and other features, objects and advantages of this invention will become more apparent from the following detailed description and drawings in which.

Figure 1:
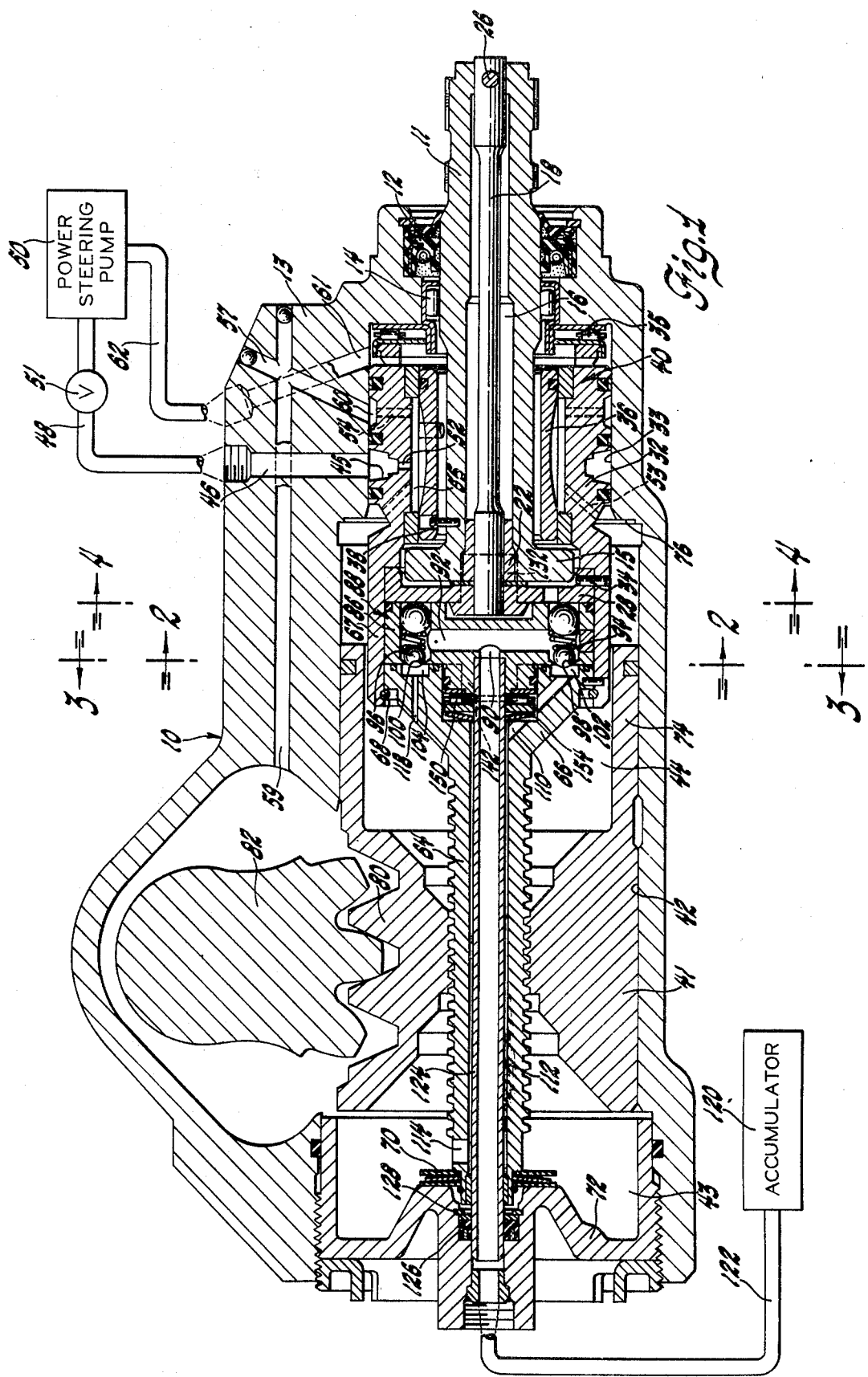
FIG. 1 is a side view of a power steering gear with certain parts in section and certain other parts in elevation.

Turning now in greater detail to the drawing, there is shown in FIG. 1 a vehicle power steering gear 10 having an elongated stub shaft 11 extending through fluid seal means 12 in the end of a steering gear housing 13 and mounted for turning movement therein by radial bearing 14. The stub shaft is turned by a hand wheel not shown and terminates in an enlarged cylindrical head portion 15. Stub shaft 11 also has an axial passage 16 therethrough which receives an elongated torsion bar 18 supported for twisting movement therein by bearing 22. The outer end of the torsion bar 18 is secured by pin 26 to the stub shaft 11 while the inner end is drivingly connected to an annular end cap 28 which is in turn drivingly connected to cylindrical valve body 32 by a connector pin 34. The valve body 32 is supported for turning movement in a bore 33 in housing 13 and extends axially therein into engagement with a thrust bearing 35 at the end of bore 33. A cylindrical valve spool 36 supported radially inwardly of valve body 32 is connected to the stub shaft 11 by a radial pin 38 for turning movement therewith. The valve body and valve spool are relatively rotatable with respect to one another in response to turning movement of the stub shaft 11 and form a primary valve assembly 40 controlling the hydraulically powered movement of a piston nut 41 movably mounted in a bore 42 in housing 13 and cooperating therewith to respectively form right and left hand turn pressure chambers 43 and 44.

More specifically the valve body has an outer pressure groove 45 formed therein which is connected by housing passage 46 to a supply line 48 leading from an engine-driven power steering pump 50. A one-way valve 51 in line 48 prevents the passage of oil from the valve assembly 40 to the pump 50 in the event the pump is inoperative. A radial bore 52 in the valve body connects into the pressure groove and may be selectively hydraulically connected to either left or right turn passage means 53 or 54 in the valve body by cooperating axially extending land and groove means 55 provided by the valve body and valve spool under predetermined operating conditions disclosed and described in U.S. Pat. No. 3,022,772 issued Feb. 27, 1962 to P. B. Zeigler et al. for Rotary Power Steering Valve with Torsion Bar Centering. Drilled passages 57 and 59 in housing 13 connect right turn power groove 60 in the valve body with right turn chamber 43. Drilled passage 61 is an exhaust passage for returning fluid to the pump 50 via connecting line 62.

An elongated screw or worm 64 extends axially from the valve body 32 in the housing 13. In the preferred construction the screw 64 has an enlarged cylindrical head 66 that snugly nests within the cylindrical inboard end 67 of the valve body 32. A retainer ring 68 seated in the end of the valve body prevents the axial separation of the valve body and screw 64 to thereby eliminate the need of bulkhead construction found in many prior art power steering gear units.

The axially extending screw 64 is supported at its far end by a thrust bearing assembly 70 which is operatively disposed between an adjuster plug 72 threaded in one end of housing 13 and a shoulder formed on the end of the screw 64. The screw 64 is threaded through the piston nut 41 which is slidably mounted in the enlarged bore 42 and which has a cylindrical skirt portion 74 that is capable of telescoping over the inner cylindrical end 67 of valve body 32. By virtue of the meshing threads on the screw 64 and piston nut 41, mechanical rotation of the screw 64 causes the sliding movement of the piston nut 41 in bore 42 limited on one side by contact with the end plug 72 and on the other side by contact with radial wall 76 formed at the end of bore 42.

The piston nut 41 has a rack whose teeth 80 mesh with the teeth of a sector gear 82 that is mounted for limited turning movement in housing 14. The sector gear 82 is operatively connected through a pitman shaft and associated linkage to the dirigible wheels of the vehicle not shown.

Figure 2:
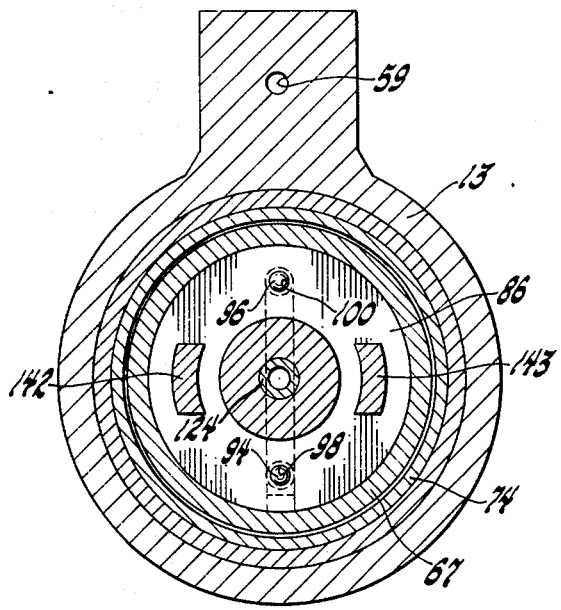
FIG. 2 is a view taken on line 2—2 of FIG. 1 looking in the direction of the indicating arrows.
Figure 3:
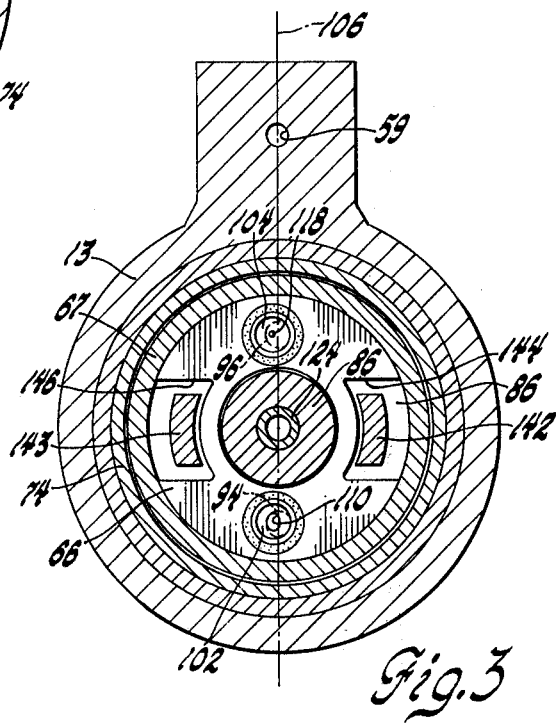
FIG. 3 is a view taken along lines 3—3 of FIG. 1.
Figure 4:
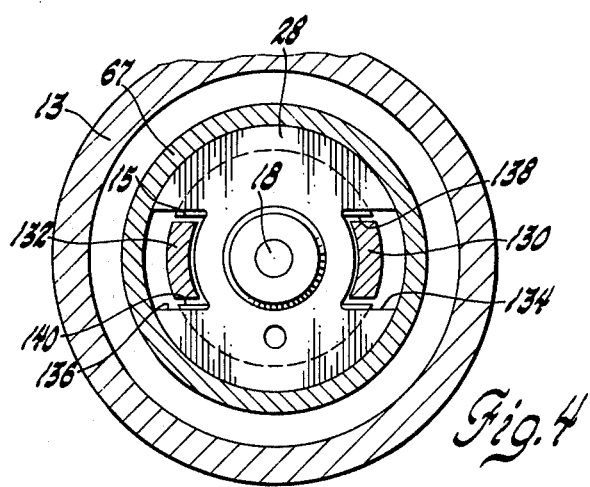
FIG. 4 is a view taken along lines 4—4 of FIG. 1.

Encapsulated between the torsion bar end cap 28, the end 67 of the valve body 32 and the head 66 of the screw 64 is a cylindrical body 86 of a secondary closed center valve 88 which controls the operation of the steering gear in the event of the absence of operating pressure from the power steering pump. This valve body has a centralized fluid inlet 90 that supplies a cross passage 92 which leads to right and left spring biased ball check valves 94 and 96 which are normally seated in discharge ports 98 and 100 respectively. As best shown in FIGS. 1 and 2, the balls of these check valves project beyond the end face of the secondary valve body into corresponding cylindrical pockets 102 and 104 formed internally of the screw head 66. As best shown in FIG. 3, these pockets are slightly offset to one side of the center line 106 so that the ball valves may be selectively actuated in response to the appropriate limited rotary movement of valve body 86 with respect to screw head 66. In viewing FIG. 3, the counterclockwise movement of valve body 86 with respect to the cylindrical head 66 of the screw 64 results in the inward displacement of the ball of valve 94 by the wall of pocket 102. This action cracks valve 94 as valve 96 centers and remains closed. With clockwise movement of valve body 86 with respect to the cylindrical head 66 valve 96 will be contacted and displaced to the open position by the wall of pocket 104 while valve 94 being moved to a centralized position remains closed.

Pocket 102 communicates with right hand turn chamber 45 via passage 110 in head 66, axial passage 112 in screw 64 and radial passage 114 adjacent the thrust bearing assembly 70. Pocket 104 communicates with the left hand turn chamber 44 by passage 118 in head 66. The valve body 86 and more specifically cross passage 92 is supplied with pressure fluid from an accumulator 120 through line 122 centrally connected into end plug 72 and by a centralized torsion tube 124 that is secured at its inner end to the valve body 86 and at its outer end to the screw 64.

The torsion tube 124, being secured at one end to valve body 86 and secured at its other end to the screw 64, spring loads these two components so that the ball check valves are normally seated and block oil flow from accumulator 120 into chamber 42 or chamber 44. Annular seal 126, disposed around torsion tube 124 and secured in the end plug 72 by retainer means 128, prevents the leakage of hydraulic fluid from chamber 43 to the exterior of housing 13.

Valve body 86 is provided with two drive tangs 130 and 132 which extend axially through slots 134 and 136 in torsion bar cap 28 and into corresponding slots 138 and 140 formed in the head 15 of the stub shaft 12 so that there is a mechanical drive connection between the stub shaft and the valve body. Also the valve body 86 is drivingly connected to the cylindrical head 66 of the screw 64 by drive tangs 142 and 143 which extend from the valve body into slots 144 and 146 in the head 66 and cooperate therewith to form a lost motion connection.

A thrust bearing 150 is operatively mounted between the head 66 of the steering screw 64 and the valve body 86 to reduce friction between these components and provide support for their limited relative rotational movement under certain operating conditions that will be described below.

In normal operation, the vehicle operator steers the vehicle by turning the hand wheel in the appropriate steering direction to correspondingly turn the stub shaft 11. This actuates the primary valve assembly as described in the above-identified U.S. Pat. No. 3,022,772 to Zeigler et al. to provide power assisted vehicle steering. In the event of a loss in power steering pressure, the closed center valve 88 is activated for continued power assisted steering. Assuming the absence of pressure from pump 50 and that the stub shaft has been turned by the hand wheel a sufficient amount to wind the primary torsion bar and close the primary valve, the secondary valve body 86 will be turned relative to the cylindrical head 66 of the screw. With clockwise turning of the valve body, ball check valve 96 will be opened as ball check valve 94 is more centrally located and therefore remains closed. Under these conditions, pressure oil from accumulator 120 flows through the central passage provided by torsion tube 124 into chamber 44 via ball check valve 96 and passage 118. With accumulator pressure present in chamber 44, the rack piston 74 moves to the left in FIG. 1 to accordingly turn the sector gear 82 and the dirigible wheels of the vehicle. When manual steering effort ceases, the head 66 of the screw and secondary valve body 86 again become centered to complete the powered steering. With rotation of the hand wheel by the operator in an opposite direction, valve 94 will be cracked as valve 96 becomes more centered so that chamber 43 is fed with accumulator pressure through valve 94, passages 112 and 114. Under these conditions, the piston 76 is moved to the right to actuate the sector gear power assisted left turn steering. Duration of this back up steering depends on the accumulator capacity and the amount of rack-piston travel required from the secondary system for each maneuver.

However, when the accumulator is exhausted, the steering gear of this invention provides for steering in the manual mode. Thus, the steering screw 64 may be turned through the mechanical connection between the stub shaft, valve body 88 and the head 66 of the screw 64. The axial load value on the screw is much greater than is seen in the primary and secondary power modes and may exceed the capacity of the thrust bearing 150. To protect the bearing, Belleville spring 154 is employed in the thrust bearing assembly. This spring has sufficient force to carry the axial loads under both modes of power application and under manual mode high load condition, the spring deflects to a point where the interface surfaces of head 66 and valve body 86 contact and carry the high axial load. Thus, the thrust bearing 150 sees no more load than what is required to collapse spring 154 regardless of the level of the axial load imposed thereon.

From the above, it will be appreciated that this invention maintains powered dirigibility of the vehicle even when there is no pressure from the prime source and that the secondary valve will maintain its own integrity due to the sealing provided by the ball check valves. In this regard, proper secondary valve action is maintained due to the spring action provided by the torsion tube on the principal parts of the secondary valve. In addition to the above, the location of the torsion tube is such that a small diameter seal 126 used in the end plug does not cause any appreciable drag on the functioning parts of the power steering gear during the primary mode of operation. Also, the spring loaded thrust bearing assembly provides for low hysteresis in the secondary valve while being self protecting during high load manual steering modes.

While a preferred embodiment has been shown and described to illustrate this invention, modifications and variations will now be apparent to those skilled in the art. Accordingly, this invention is not to be limited to any particular embodiment but only by the following claims.

What is claimed is:

1. A power steering gear for a vehicle comprising a housing, rotatable input means rotatably mounted in said housing, output means rotatably mounted in said housing and extending outwardly therefrom, piston means mounted for sliding movement in said housing and drivingly connected to said output means for rotating said output means, threaded means drivingly connecting said input means to said piston means to permit said input means to move said piston means in said housing, said piston means dividing said housing into first and second fluid pressure chambers, a first source of fluid pressure, first valve means in said housing operatively connected to said first source of fluid pressure and actuated by said input means to selectively charge said first and second chambers to provide the hydraulically powered movement of said piston means and the resultant turning of said output means, exhaust passage means connecting said first valve means to said first source of fluid pressure, an auxiliary source of fluid pressure, second valve means in said housing and axially aligned with said first valve means drivingly connected to said first valve means for controlling the flow of pressure fluid from said auxiliary source to said fluid pressure chambers, said second valve means being hydraulically connected to said auxiliary source of fluid pressure and actuated by said input means when said first valve means is moved to a predetermined position in response to lowered pressure from said first source to selectively charge said chambers to provide for the auxiliary powered movement of said piston means and the resultant turning of said output means.

2. A power steering gear for a vehicle comprising a housing, rotatable input means extending into said housing, rotatable output means extending from said housing, piston means mounted for axial sliding movement in said housing and operatively connected to said output means for rotating said output means, power transmission means drivingly connecting said input means to said piston means to permit said input means to move said piston means in said housing, said piston means dividing said housing into first and second fluid pressure chambers, a first source of fluid pressure, open-center valve means in said housing operatively connected to said first source of fluid pressure and actuated by said input means to selectively charge said first and second chambers to provide the powered movement of said piston means and the resultant turning of said output means, an exhaust passage means connecting said open-center valve means to said first source of fluid pressure, an auxiliary source of fluid pressure, closed-center valve means in said housing axially aligned with said open-center valve means and operatively connected to said open-center valve means and hydraulically connected to said auxiliary source of fluid pressure, said closed-center valve means being actuated by said input means when said open-center valve means is moved to a fully closed position in response to lowered pressure from said first source to selectively charge said chambers to provide for the auxiliary hydraulic powered movement of said piston means and the resultant turning of said output means.

3. A power steering gear for a vehicle comprising a housing, rotatable input means extending into said housing, rotatable output means extending from said housing, piston means mounted for axial sliding movement in said housing and drivingly connected to said output means for rotating said output means, screw means extending through said piston means and drivingly connecting said input means to said piston means to permit said input means to move said piston means in said housing, said piston means dividing said housing into first and second fluid pressure chambers, a first source of fluid pressure, open-center valve means in said housing operatively connected to said first source of fluid pressure and actuated by said input means to selectively charge said first and second chambers to provide the powered movement of said piston means and the resultant turning of said output means, exhaust passage means connecting said open-center valve means to said first source of fluid pressure, an auxiliary source of fluid pressure, closed-center valve means in said housing and in one end of said open-center valve means, said closed-center valve means being drivingly connected to said open-center valve means and hydraulically connected to said auxiliary source of fluid pressure and actuated by said input means when said open-center valve means is moved to a fully closed position in response to lowered pressure from said first source to selectively charge said chambers to thereby provide for the auxiliary powered movement of said piston means and the resultant turning of said output means.

4. A power steering gear for a vehicle comprising a housing, rotatable input means extending into said housing, rotatable output means extending from said housing, hydraulically actuated piston means mounted for movement in said housing for turning said output means, a primary hydraulic power system operatively connected to said piston means for moving said piston means in said housing, a secondary hydraulic power system operatively connected to said piston means for moving said piston means in said housing when there is a sufficient loss in pressure in said primary hydraulic power system, said secondary hydraulic power system incorporating an accumulator for storing pressure fluid and a closed-center valve in said housing adjacent to said open-center valve, said closed-center valve being operatively connected to said accumulator, said closed-center valve having cooperating first and second valve parts, said first valve part being operatively connected to said input means and being relatively rotatable with respect to said second valve part, said closed-center valve hydraulically connecting one side of said piston means to said accumulator when relatively rotated in a first direction by said input means and hydraulically connecting the other side of said piston means to said accumulator when relatively rotated in a direction opposite to said first direction by said input means to thereby move said piston means in said housing and spring means operatively connected to said closed-center valve to center said valve parts thereof to thereby terminate pressure from said accumulator to said piston means in response to the termination of rotation of said input means.

5. The invention defined in claim 4 wherein said spring means is a torsion tube for centering said valve parts of said closed-center valve and for hydraulically connecting said accumulator with said closed center valve.

* * * * *